United States Patent Office 3,044,558
Patented July 17, 1962

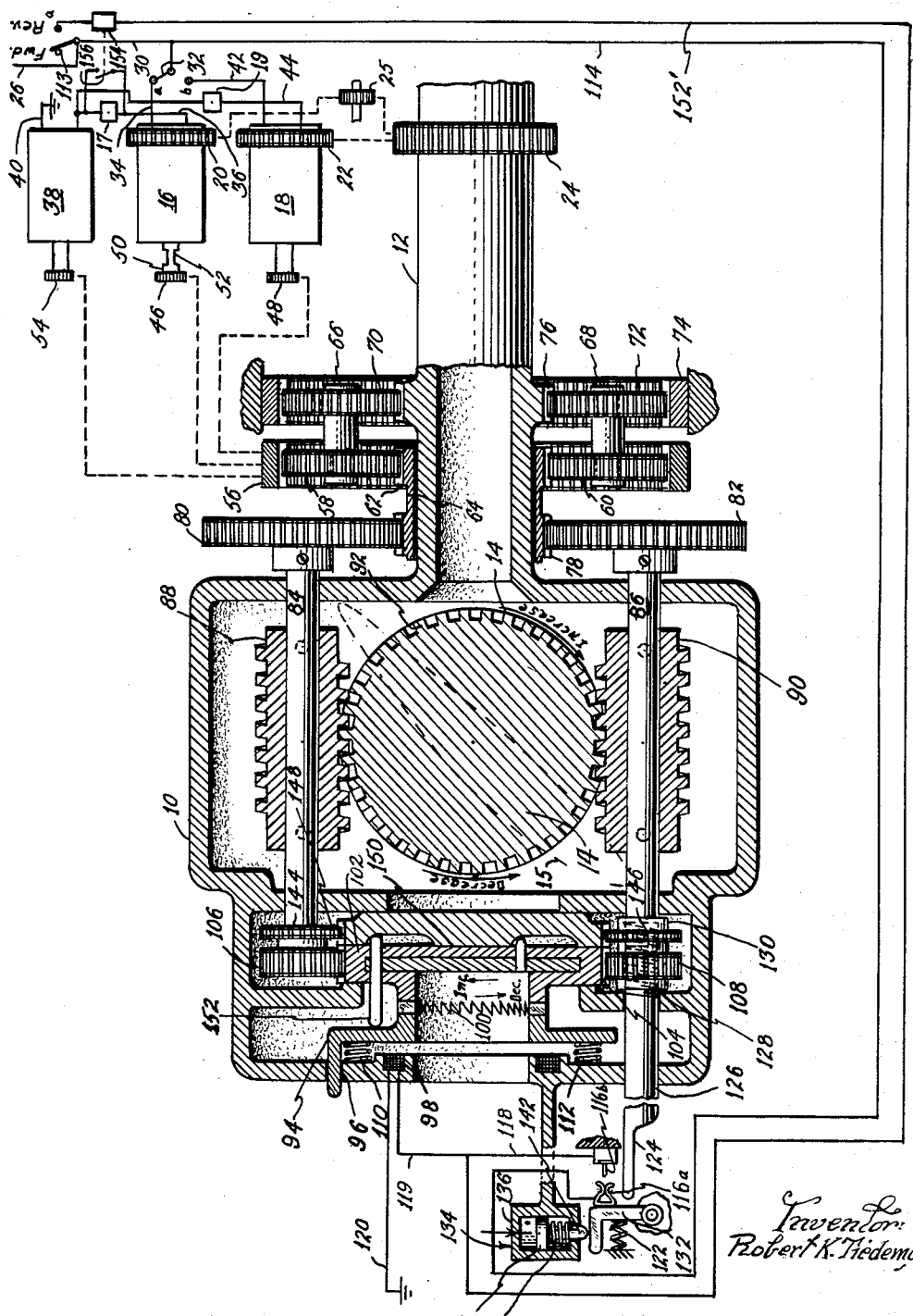

3,044,558
PROPELLER PITCH CONTROL SYSTEM
Robert K. Tiedeman, Packanack Lake, N.J., assignor to Curtiss-Wright Corporation, a corporation of Delaware
Filed Jan. 5, 1960, Ser. No. 582
6 Claims. (Cl. 170—160.18)

My invention relates to a pitch control system for a propeller, such system incorporating mechanism controllable according to blade angle and speed of rotation of the propeller for positively locking the propeller blade at times against decreasing blade angle changes.

The pitch control system of the invention is similar to the "Propeller Pitch Change Mechanism" of Patent No. 2,793,703, issued May 28, 1957, and assigned to the same assignee as the present invention, insofar as both inventions incorporate electrically actuated clutches for connecting and disconnecting pitch changing mechanism to a prime mover, and include an electrically controlled brake for holding the propeller blade at times against pitch changes. In both systems braking and declutching are controlled according to the operation of limit switches to prevent the propeller blades from decreasing in pitch below a particular low blade angle, and from increasing in pitch above a particular high blade angle.

It is a further object of this invention, however, to provide pitch locking mechanism and control means therefor to prevent the propeller blades from decreasing in pitch in the event of failure of the low pitch limit switch or clutch seizure, the pitch locking mechanism nevertheless permitting pitch increase.

Another object of the invention is to provide for the operation of the locking mechanism in the event of propeller overspeed to thereby prevent the blades from decreasing in pitch angle.

Still another object of the invention is to provide selectively operable means to permit pitch decrease into the reverse pitch range as required.

Other objects and advantages of the invention will become apparent hereinafter.

In accordance with the invention pitch locking mechanism is electromagnetically controlled over an energizing circuit which includes contact means operable both at a particular blade angle and in response to propeller overspeed. At a predetermined blade angle and upon occurrence of an overspeed condition, the locking means becomes effective to stop the operation of pitch changing mechanism in a direction corresponding to decreasing blade angle. The pitch locking means nevertheless permits the propeller to increase in blade angle. A selectively operable parallel circuit permits pitch decrease into the reverse pitch range as required for braking or other ground operations.

The drawing is a diagrammatic showing of a pitch control system embodying the features of the invention.

In the drawing, reference character 10 designates hub structure for mounting the blades of an aircraft propeller, the blades being securable in hub sockets in conventional fashion. The hub structure and propeller blades are rotatable by a drive shaft 12 which is driven by prime mover (not shown). Reference character 14 designates the blade gear of one of the propeller blades 15, such blade gear being secured to the base end of the blade and constituting means through which the blade may be positioned in various angles of pitch.

Pitch changing mechanism includes a decrease pitch clutch 16 and an increase pitch clutch 18. Input elements of clutches 16 and 18 include gears 20 and 22 respectively, which are driven by a gear 24 on shaft 12, the drive connection between gears 24 and 20 including idler 25 to provide a direction of rotation for clutch 16 opposite to that of clutch 18. These clutches, which are electrically controlled may be of the type shown in Patent No. 2,738,-045 of J. M. Mergen et al., issued March 13, 1956, and assigned to the same assignee of the present invention. The clutches couple when energized and decouple when deenergized.

Decrease pitch clutch 16 is energizable over the circuit extending from main supply 26, over lead 30, contact 32a, lead 34, through the clutch 16, over lead 36 including low pitch limit switch 17, through a brake 38, and over ground connection 40. Increase pitch clutch 18 is energizable over the circuit extending from main supply 26, over lead 30, contact 32b, lead 42, through clutch 18, over lead 44 including high pitch limit switch 19, through the brake 38, and over ground connection 40. Decrease pitch clutch 16 or increase pitch clutch 18 is energized, depending upon position of contact element 32, to operatively connect output pinion 46 of clutch 16 or output pinion 48 of clutch 18 with gear 24 on shaft 12. As shown in the drawing a shear member 50 having a reduced cross-section 52 is provided between the pinion 46 and elements of clutch 16. The purpose of shear member 50 will become clear hereinafter. Inasmuch as the energizing circuits for the decrease and increase pitch clutches extend through the brake 38, the brake 38 is energized whenever one or the other of the clutches is in an energized position. The brake includes a solenoid actuated disk brake assembly, one of the disk sets carrying the pinion 54 and the other set being anchored against rotation. The brake is normally spring pressed into braking engagement and the solenoid, when energized, overcomes the springs and releases the brake.

The pinions 46, 48 and 54 operatively connect with a movable ring gear 56 which meshes with a plurality of planetary pinions such as 58 and 60. The pinions 58 and 60 engage gear 62 on a sleeve 64 which is rotatably mounted on shaft 12. The planetary pinions 58 and 60 are secured upon shafts 66 and 68 respectively, which shafts also have pinions 70 and 72 corresponding in size to pinions 58 and 60 secured thereon. The pinions 70 and 72 mesh with the teeth of a fixed ring gear 74, which is of the same size of movable ring gear 56, and are engaged by a gear 76 on shaft 12. Rotation of shaft 12 results in sleeve 64 being moved in one direction or the other according to whether decrease pitch clutch 16 or increase pitch clutch 18 is energized to connect movable ring gear 56 through one or the other of the clutches with the gear 24 on shaft 12. If neither of the clutches 16 or 18 is energized, ring gear 56 is held by the brake 38 and sleeve 64 is restrained against rotation. Sleeve 64 includes gear 78 which meshes with the gears 80 and 82, the latter gears being fixedly secured upon shafts 84 and 86 respectively. A worm gear 88 is fixedly mounted upon shaft 84 and a worm 90 is similarly mounted upon shaft 86. These worm gears engage the teeth 92 of blade gear 14. Accordingly, any rotation of the sleeve 64, due to the energization of the increase or decrease pitch clutches is imparted through the gears 78, 80, 88 and 78, 82, 90 to the blade gear 14 to respectively increase or decrease pitch of the propeller blade.

The pitch lock mechanism of the invention includes the axially movable member 94 which is slidably mounted, but rotationally fixed in the hub structure as at 96. The member 94 is of magnetic material and constitutes the armature of a solenoid, the coil of which is designated by reference character 98. Armature 94 is shown engaged through ratchet teeth 100 with member 102. In this position of the armature the worms 88 and 90 and therefore the blade gear 14 and propeller blade 15 are held against decreasing pitch changes by reason of the engagement of gear 104 on member 102 with pinions 106 and 108 on shafts 84 and 86 respectively.

This locking position of the armature 94 corresponds to the deenergized condition of coil 98. Normally, however, the coil 98 is energized to hold the armature 94 in a position to the left of that shown in the drawing with springs such as 110 and 112 compressed, whereby the armature 94 is disengaged from the member 102 at 100.

In the forward pitch position of a manually controllable arm 113, coil 98 is energizable over the circuit extending from the main supply line 26 over lead 30, line 114, contacts 116a and 116b when closed, lead 118, lead 119, through the coil 98, and over the ground connection 120. Contacts 116a and 116b, while shown in an open position in the drawing, are normally maintained closed as by the action of spring 122. The contacts are, however, opened at a predetermined blade angle by finger 124 on rod 126 which has a screw connection at 128 in socket 130 on shaft 86. The rod 126 is indexed with respect to the shaft 86 to cause engagement of the finger 124 with contact arm 132 and the opening of contacts 116a and 116b at a pitch angle which is preferably slightly below the low pitch setting at which limit switch 17 opens. Contacts 116a and 116b are also subject to being opened at times by a speed responsive device 134, which includes cylinder 136 secured to hub structure 10, and a piston 138 mounted therein movable outwardly from the axis of rotation of the propeller and shaft 12 against the action of spring 140 by centrifugal force as the hub is rotated by drive shaft 12. The piston 138 has an actuating member 142 secured thereon which engages contact arm 132 at a predetermined speed corresponding to an overrunning of the propeller to open contacts 116a and 116b and thereby deenergize the coil 98.

As previously mentioned, coil 98 is normally maintained energized in forward pitch operation and the armature 94 is out of engagement with the member 102. This permits the blade gear 14 to be moved in the direction of decreasing pitch or increasing pitch by the clutches 16 or 18 respectively according to whether contact 30a or 30b is closed and within the range defined by low and high pitch limit switches 17 and 19. The extent to which pitch may be decreased is limited first by the limit switch 17 and secondly by the pitch lock mechanism of the invention. Switch 17 becomes effective to open the energizing circuit for the decrease pitch clutch 16 and brake 38 at a predetermined blade angle. The pitch lock mechanism of the invention, however, comes into play at slightly below this predetermined angle in the event the limit switch 17 is ineffective or in the event a clutch seizure develops. The pitch lock mechanism is actuated by the engagement of the fingers 124 with arm 132 which engagement opens contacts 116a and 116b to deenergize the coil 98 and cause the toothed engagement at 100 of armature 94 and member 102. Normally when the propeller blade is held against pitch changes by the pitch locking mechanism, the clutch plates of the decrease pitch clutch 16 will slip. The shear member 50, however, provides protection against any possible damage to the clutch should the clutch seize as a result of prolonged overheating. At such time the member 50 will shear at reduced cross-section 52 to prevent destruction of elements in the clutch.

Although the toothed engagement of armature 94 and member 102 permits further decreases in pitch, pitch increase is not prevented. Pitch may be increased inasmuch as member 102, when driven in the direction corresponding to increasing pitch, acts through the ratchet teeth of the engaging members at 100 to move armature 94 axially to the left, as viewed in the drawing, against springs 110 and 112, and out of engagement with member 102 such that member 102, the pitch changing mechanism and propeller may be moved in the direction of increasing pitch.

The speed responsive member 134 operates independently of the pitch angle of the propeller blade and is effective to open contacts 116a and 116b, and thereby cause the armature 94 to assume its locking position at angles greater than the predetermined lower limit pitch angle when overrunning of the propeller occurs. Decreasing blade angle is thereby prevented as long as the overrunning condition persists. As shown, the shafts 84 and 86 have gears 144 and 146 thereon which mesh with a gear 148 having a plurality of cam surfaces 150 on the face thereof. These cam surfaces are indexed to force pins 152 against the armature to move the armature out of a locking position at a predetermined high blade angle when the normal energizing circuit for coil 98 is open. This allows decrease pitch operation at high blade angles, regardless of speed, to permit centering the propeller in the feather position, and as required, when air starting procedure is employed (i.e. starting with the aid of an air start motor).

In the reverse pitch position of contact arm 113, contact 113a is closed to establish an additional energizing circuit for the coil 98 bypassing contacts 116a and 116b, such energizing circuit extending from the main supply line 26 over contact 113a, line 152' including relay 154, lead 119, through the coil 98, and over ground connection 120. The pitch lock mechanism, including armature 94 is, therefore, prevented from locking the pitch changing mechanism against decreasing pitch release of blade angle. Relay 154 is energized to pick up contact 156 thereby establishing a circuit around the low pitch limit stop 17 such that pitch may be decreased below the lower limits of pitch defined by the low pitch limit stop and pitch lock mechanism, and into the reverse pitch range. The speed of the propeller has no controlling effect with the contact arm 113 in the reverse pitch position inasmuch as the speed responsive device 134 can operate only through the bypassed contacts 116a and 116b.

While I have shown and described only one embodiment of my invention, it will be readily apparent to those skilled in the art that various changes and modifications may be made in the disclosed structure without departing from the spirit and scope of the invention as covered in the annexed claims.

I claim:

1. In a pitch control system for a propeller blade, means mechanically connected with the propeller blade for movement thereby during pitch changes, mechanism operable according to blade angle, other mechanism operable according to rotative speed of the propeller, a solenoid, an energizing circuit for the solenoid controllable by each said mechanism, and an armature for said solenoid to engage the mechanically connected means at a predetermined blade angle and at a predetermined rotative speed of the blade to limit pitch change.

2. A pitch control system for a propeller blade comprising drive means for moving said propeller blade to change pitch; means for disconnecting the said drive means from the propeller blade at some predetermined blade angle; means mechanically connected with the propeller blade and moved thereby during pitch changes; holding means actuable at a blade angle differing slightly from said predetermined blade angle into a position of engagement with the mechanically connected means to positively limit blade pitch changes in a particular direction in the event the disconnecting means becomes ineffective.

3. A pitch control system as defined in claim 2 including a brake activated to hold the propeller blade when the drive means is disconnected.

4. The combination as defined in claim 3 including speed responsive means to actuate the holding means into a position of engagement with the mechanically connected means to positively limit pitch changes in the said particular direction at a predetermined speed of rotation of the propeller.

5. The combination as defined in claim 2 including mechanism for disengaging said holding means and said mechanically connected means at a predetermined high blade angle regardless of propeller speed whereby the propeller blade may be thereafter moved to decrease pitch at angles greater than such predetermined high blade angle.

6. In a pitch control system for a propeller blade, means mechanically connected with the propeller blade for movement therewith during pitch changes, means operable according to blade angle, unidirectionally acting holding means responsive to the operable means to engage the mechanically connected means at a predetermined low blade angle to prevent the blade from decreasing in pitch below such blade angle, and mechanism rotatable with the propeller and operable by centrifugal force for causing said holding means to engage the mechanically connected means upon overrunning of the propeller and thereby prevent the blade from decreasing in pitch.

References Cited in the file of this patent

UNITED STATES PATENTS

| | | |
|---|---|---|
| 2,620,901 | Stearns | Dec. 9, 1952 |
| 2,646,131 | Mergen | July 21, 1953 |
| 2,666,490 | Richmond | Jan. 19, 1954 |
| 2,781,856 | Danvers | Feb. 19, 1957 |
| 2,882,975 | Hirsch | Apr. 21, 1959 |
| 2,888,992 | Hendrix | June 2, 1959 |